United States Patent [19]
Bäumer et al.

[11] 3,913,192
[45] Oct. 21, 1975

[54] DEVICE FOR CLAMPING A THIN-WALLED TOOL SPINDLE SLEEVE

[75] Inventors: Michael Bäumer, Munich; Ludwig Baumgartner, Neugermering, both of Germany

[73] Assignee: Friedrich Deckel Aktiengesellschaft, Munich, Germany

[22] Filed: July 24, 1973

[21] Appl. No.: 382,179

[30] Foreign Application Priority Data
Aug. 3, 1972 Germany............ 2238287

[52] U.S. Cl. ............ 29/1 A; 90/11 A; 90/DIG. 28; 285/302; 403/104; 408/234
[51] Int. Cl.² .............. B23Q 1/28; B23C 9/00
[58] Field of Search ............ 408/234, 238; 90/11 A, 90/DIG. 28, 11 R; 29/1 A; 188/67; 74/531; 403/104, 110; 85/77, 84; 83/700; 269/48.1, 283, 49, 93, 240; 285/302, 303, 330, 403

[56] References Cited
UNITED STATES PATENTS

| | | | |
|---|---|---|---|
| 744,559 | 11/1903 | Kendrick | 269/93 X |
| 756,058 | 3/1904 | Royle | 269/93 |
| 2,281,482 | 4/1942 | Crayton | 269/93 X |
| 2,353,088 | 7/1944 | Schutz | 29/1 A |
| 3,455,207 | 7/1969 | Meinke | 408/129 X |
| 3,545,335 | 12/1970 | Lehmkuhl | 90/11 |
| 3,743,333 | 7/1973 | Kosinski | 403/362 |

*Primary Examiner* — Donald R. Schran
*Assistant Examiner* — W. R. Briggs
*Attorney, Agent, or Firm* — Woodhams, Blanchard and Flynn

[57] ABSTRACT

Device for clamping an axially feedable thin-walled tool spindle sleeve. A thin-walled tool spindle sleeve is received within an appropriate opening in a support housing and in turn internally supports bearings on which the tool spindle is guided and rotates. Means are provided for permitting when unclamped the sleeve to move axially of the spindle and when clamped to hold the sleeve against such axial movement. Said means include a longitudinally aligned slot opening exteriorly of the sleeve and clamping means received within said slot for clamping same and further means threadedly related to the casing for moving the clamping means radially inwardly or outwardly as desired to clamp or unclamp said sleeve. Said clamping means in certain embodiments are pulled snugly against the sides of the slot for resisting longitudinal movement of the sleeve with respect to the housing and in all embodiments spread circumferentially the sides of said slot to cause the surfaces of sleeve adjacent thereto to bear engagingly against the surface of the housing surrounding same, particularly in the region of the slot. In one embodiment a groove having a dovetail cross section receives a correspondingly shaped clamp and same is actuated by pulling said clamp radially outwardly of said sleeve. In another embodiment a spreading device moves radially outwardly of said sleeve and thereby through intermediate means effects opposite circumferential pressure onto parallel walls of the slot for effecting a distortion of the sleeve sufficient to cause same to bear tightly against the housing walls surrounding same.

7 Claims, 5 Drawing Figures

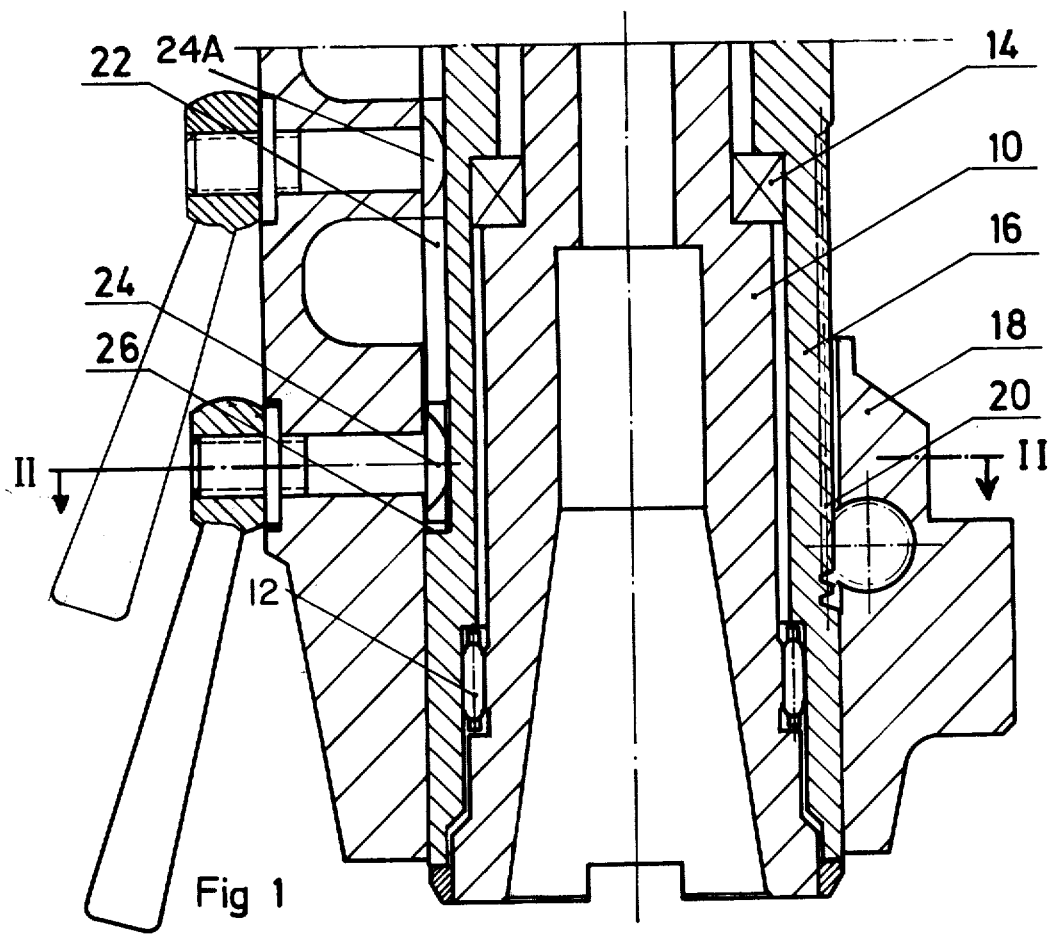
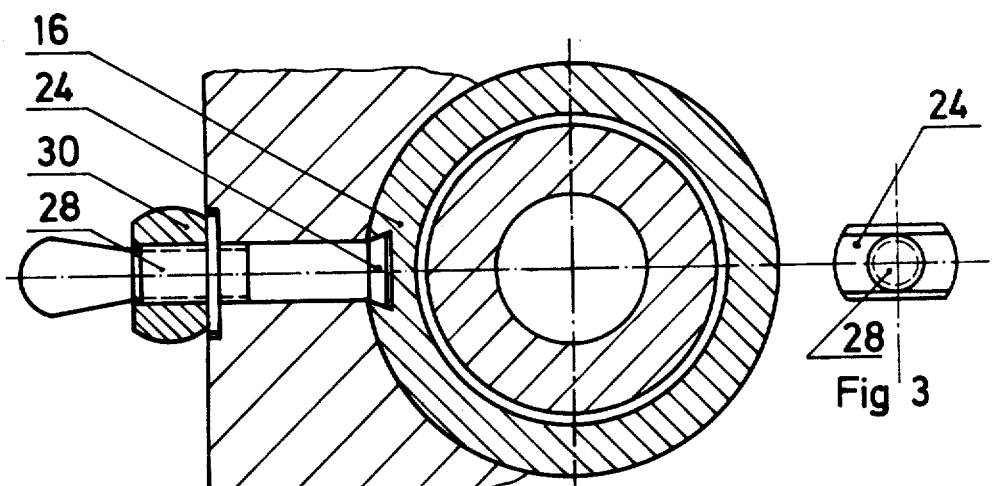

DEVICE FOR CLAMPING A THIN-WALLED TOOL SPINDLE SLEEVE

FIELD OF THE INVENTION

The invention relates to a device for clamping of a thin-walled, feedable tool spindle sleeve into a stationary spindle housing.

BACKGROUND OF THE INVENTION

Spindle sleeve clamping is for the purpose of holding the tool spindle in any axial position and in so doing it is essential that the clamping operation itself effect only minimal, if any, change in the axial and radial adjustment of the spindle.

Clamping devices are already known which restrict the spindle sleeves radially (for example German Pat. No. 970,591). Aside from their relatively high manufacturing cost, such clamping devices are inclined to deform the spindle sleeves into a noncircular condition and this causes an inaccurate operation of the spindles. However, completely circularly operating clamping devices of the known type, especially when used with thin-walled sleeves and with small bearing clearance, often compress with too much force onto the spindle bearings within the spindle sleeves so that the spindles become hot and lose their accuracy. On the other hand, with a larger bearing clearance, there is obtained an insufficiently true running or the clamping force obtained is too small. A further disadvantage of the known device also occurs in that the radially acting clamping force cannot securely hold the sleeve in the circumferential direction so that in addition to said clamping device, devices for a fixing of the spindle sleeve against rotation are also required.

The purpose of the invention is to produce a device of the above-named type which is simple and inexpensive in structure, by which a sufficient clamping force can be obtained without overheating of the spindle bearings and finally which does not affect the accuracy and the true running of the spindle.

This purpose is attained according to the invention by providing the spindle sleeve externally with at least one longitudinal groove, which longitudinal groove is engaged by at least one shoe, formed corresponding with the cross section of the longitudinal groove, and connected nonmovably in feeding direction to the housing, as is already known in flat structural parts, whereby the shoes and longitudinal grooves are formed such that the spindle sleeve is urged against the housing surrounding said spindle sleeve with minimal clearance and/or is expanded in a circumferential direction.

When the clamping device is released, the longitudinal groove can shift relative to the shoe and the spindle sleeve is accordingly axially movable. Thus the shoe acts as a rotary locking for the spindle sleeve. By tensioning the clamping device the shoe is pressed radially outwardly and/or in a circumferential direction against the surfaces of the longitudinal groove. Thus, the clamping surfaces of the shoes engage the corresponding surfaces of the longitudinal groove and in addition the entire spindle sleeve is pressed against the housing surrounding same so that an adequate frictional surface is obtained for the frictional clamping of the spindle sleeve. A portion of the clamping force is thereby transmitted through the surfaces of the shoe and the longitudinal groove because the spindle sleeve is designed for the smallest possible deformation. No appreciable eccentricity is likely even where the clamping is on only one side because the sleeve can be fitted into the housing with a very small clearance. Further, due to the clamping acting in circumferential direction, a frictional force is obtained through the spindle sleeve being expanded outwardly against the inside wall of the housing. No noticeable deformation of the sleeve occurs because of the small clearance between the housing and the sleeve.

Compared with this, the deformation occurring with those clamping devices which stress the sleeve radially inwardly is appreciable because the spindle sleeve cannot be supported on the inside and the force flow is not limited to a small part of the periphery. Tests have shown that the achievable clamping force, even in the case of a most simple construction of the invention with only one longitudinal groove and one shoe, lies above the required values and that even at the highest clamping force there is no heating of the spindle and no measurable change of the spindle adjustment. The clamping device is thus extremely simple and inexpensive to manufacture and fulfills at the same time the function of both rotary locking and axial clamping.

In order, however, to exclude even a theoretical possibility of a radial dislocation of the spindle sleeve, the invention may if desired provide two or more longitudinal grooves which are spaced equally around the circumference of the spindle sleeve. This will exclude the possibility of any force acting one-sidedly onto the spindle and the absolute clamping force can be increased.

An increase of the clamping force is obtained also when according to a further characteristic of the invention there are arranged in each longitudinal groove two or more shoes expandable against the longitudinal groove surfaces.

The shoes can serve at the same time as end stops for the feed path of the spindle sleeve by for example abutting the shoe against longitudinal limiting surfaces of the longitudinal grooves.

The longitudinal grooves can be constructed according to the invention as dovetail or as rectangular grooves. If the longitudinal grooves have a rectangular cross section the shoes are expanded in a circumferential direction against the longitudinal groove surfaces, for which purpose they are either divided in a conventional manner and are pressed apart by wedges or are simply canted in the groove.

BRIEF DESCRIPTION OF THE DRAWINGS

Several exemplary embodiments of the invention are illustrated in the drawings and will be explained more in detail hereinafter.

In the drawings:

FIG. 1 is a longitudinal cross-sectional view of a tool spindle in the clamping zone of the spindle sleeve with a shoe expandable in the spindle sleeve;

FIG. 2 is a cross-sectional view of the tool spindle according to FIG. 1 along the line II—II:

FIG. 3 is a view of the shoe of FIG. 2 seen in a radially inward direction;

DETAILED DESCRIPTION

Figure 4:
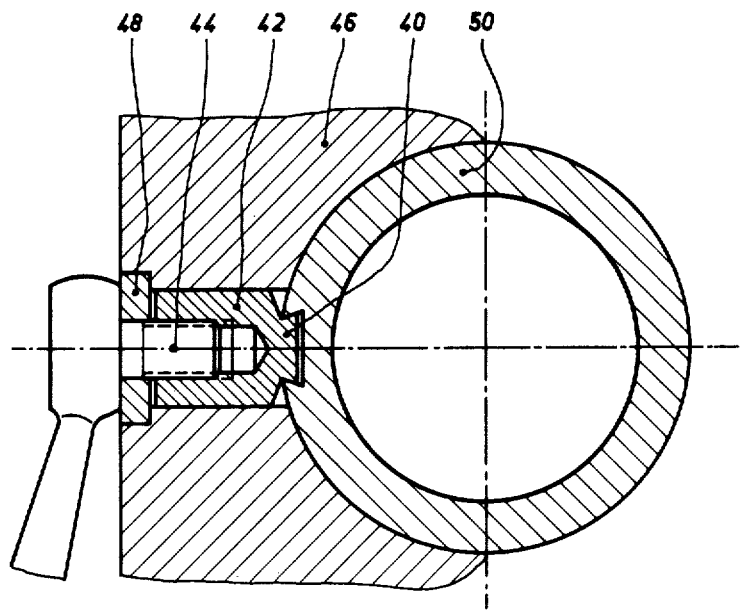
FIG. 4 is a cross-sectional view according to FIG. 2 of a different embodiment of the spindle sleeve clamping.

The tool spindle 10 which is illustrated in FIG. 1 is supported by means including a radial bearing 12 and an axial bearing 14 in a spindle sleeve 16. This spindle sleeve is shiftable in its axial direction, but is arranged nonrotatably in a housing 18 which surrounds the spindle sleeve.

The axial shifting is effected in a conventional manner, here by a manually or motor actuated pinion, which pinion engages teeth 20 of the spindle sleeve. Such axial shifting carries with it the tool spindle which is rotatably supported in the spindle sleeve.

The spindle sleeve 16 is externally provided with a longitudinal groove 22 which is engaged by a shoe 24. The longitudinal groove is preferably a dovetail groove as best shown in FIG. 2. The shoe 24 has a cross section which corresponds to this dovetail groove, whereby, however, a clearance remains in the radial direction between longitudinal groove and shoe so that the latter, when the clamping device is released, can freely slide in the groove. The longitudinal groove 22 is sufficiently long so that the spindle sleeve can make the required axial path but is so limited that the shoe abuts its longitudinal limiting surfaces 26. During the longitudinal movement of the spindle sleeve the shoe which is relatively movable in the longitudinal groove serves simultaneously as a rotary locking device.

The shoe 24 has a radially outwardly extending threaded pin 28 which is guided through a bore in the housing 18. On the screw thread on the outer end of the threaded pin there is arranged a tightening nut 30 which is provided with a handle, by means of which the shoe can be tensioned radially outwardly so that it is firmly clamped against the sloped surfaces of the longitudinal groove 22. The clamping effect is achieved partly by the friction of the shoe on the groove surfaces and in addition in that the spindle sleeve, at least in the zone of the shoe, abuts the housing 18 which closely surrounds the spindle sleeve. However, there is no appreciable deformation or eccentricity of the spindle sleeve because the clearance between spindle sleeve and housing lies in the magnitude of only a few micrometers.

An increase of the clamping force is obtained also when according to a further characteristic of the invention there are arranged in each longitudinal groove two or more shoes 24,24A (FIG. 1), expandable against the the longitudinal groove surfaces.

In FIG. 3 the shoe 24 of FIG. 2 is again illustrated in a view taken in a radially inward direction. It has an elongated shape with rounded-off lateral sides and is constructed integrally with the threaded pin 28.

FIG. 4 illustrates an exemplary embodiment for the spindle sleeve clamp which differs from that of FIG. 1. The shoe 40 is a part of a sleeve 42 which is provided with an axial taphole. A clamp screw 44 which is provided with an operating handle is turned into said taphole and said clamp screw 44 is supported against a bearing disk 48 which is in turn supported in the housing 46. To tension the clamping means, the clamp screw is tightened whereby it pulls the sleeve 42 and with it the clamping piece 40 radially outwardly. The clamping force is again produced partly by the frictional resistance between the shoe 40 and partly by the corresponding countersurfaces of the spindle sleeve 50. Furthermore, the spindle sleeve expands somewhat and thus abuts the housing wall at least in a small zone in the vicinity of the shoe so that here too a clamping force is produced.

Figure 5:
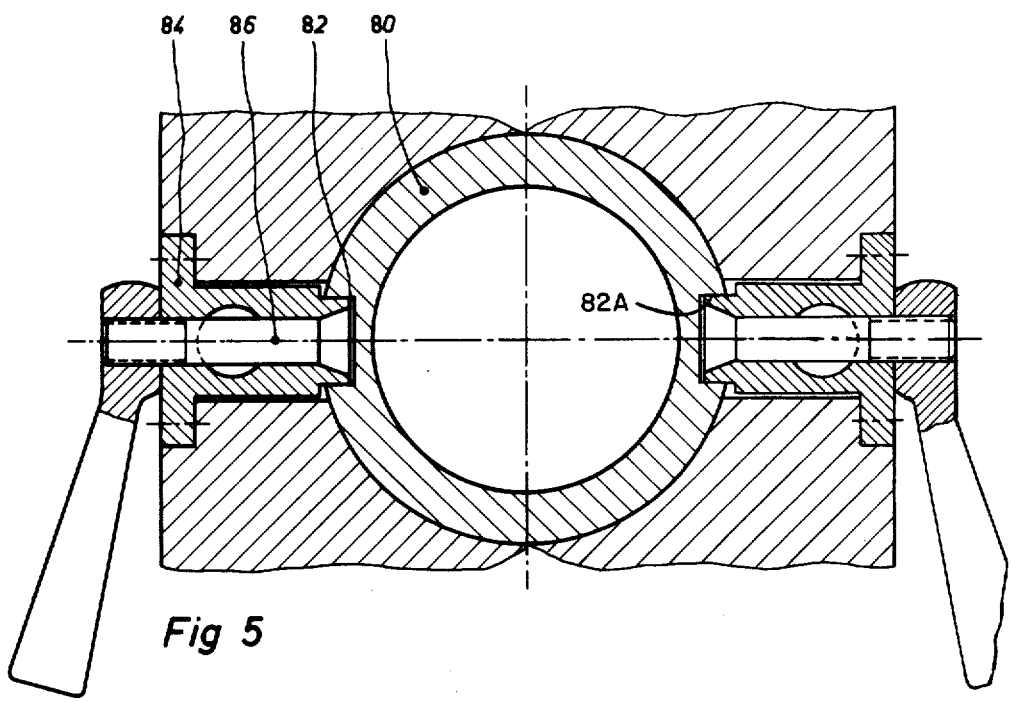
FIG. 5 is a cross-sectional view according to FIG. 2 with a shoe which is expandable in the circumferential direction.

FIG. 5, finally, illustrates a spindle sleeve 80 having a longitudinal groove 82 which is rectangular in cross section. A shoe 82 engages this longitudinal groove. The shoe is divided in a plane of symmetry which lies perpendicularly to the drawing plane and can be expanded by a wedge 86 which is pulled between the halves thereof radially outwardly so that the exterior surfaces of the shoe abut in a circumferential direction the longitudinal groove surfaces. In this manner, a frictional engagement is obtained due to the contact between the shoe and the surfaces of the longitudinal groove and in addition the frictional engagement is created due to the surfaces of the spindle sleeve adjacent the longitudinal groove abutting the inside of the housing. Again here, no appreciable deformation or eccentricity is likely due to the small clearance between the spindle sleeve and the housing.

In order, however, to exclude even a theoretical possibility of a radial dislocation of the spindle sleeve, the invention may if desired provide two or more longitudinal grooves 82, 82A which are spaced equally around the circumference of the spindle sleeve. This will exclude the possibility of any force acting one-sidedly onto the spindle and the absolute clamping force can be increased.

In none of the described exemplary embodiments is there any tight engagement of the spindle sleeve with the damaging possibility of overheated bearings.

We claim:

1. A clamping device, comprising:

a stationary spindle housing having an opening therethrough;

an axially movable, thin-walled tool spindle sleeve mounted for axial movement relative to said opening, said opening having a close tolerance fit around said tool spindle sleeve;

means defining at least one axially extending elongated groove on the periphery of said tool spindle sleeve, said groove having at least a pair of substantially circumferentially facing, separate and opposed side surfaces, said tool spindle sleeve being made of a radially expansible material facilitating a slight amount of radial expansion upon application of a circumferential force to said circumferentially facing side surfaces of said groove;

means defining at least one shoe received in said elongated groove, said shoe having a pair of oppositely facing side surfaces both having a contour corresponding to the contour of said circumferentially facing side surfaces and acting to simultaneously frictionally engage said pair of opposed and separate side surfaces of said groove; and adjusting means for moving said oppositely facing side surfaces of said shoe into and out of frictional engagement with said opposed side surfaces of said groove to effect said slight radial expansion of said tool spindle sleeve, said frictional engagement being caused by a component of force acting at least in a circumferential direction relative to said tool spindle sleeve whereby said tool spindle sleeve is maintained in a fixed position within said opening by a combination of the frictional engagement between said side surfaces of said groove and said shoe and the frictional engagement between the outer diameter of said tool spindle sleeve and the internal surface of said opening after radial expansion of said tool spindle sleeve.

2. The device according to claim 1, including a plurality of longitudinal grooves which are equally spaced from each other on the periphery of said tool spindle sleeve, each groove having shoe means mounted therein and adjusting means for controlling the relative movement between said shoe means and said groove.

3. The device according to claim 1, wherein a plurality of shoe means are received in said longitudinal groove; and
wherein a plurality of adjusting means are provided to effect said frictional engagement of each of said shoe means with said surfaces of said groove.

4. The device according to claim 1, wherein said longitudinal groove is constructed as a dovetail-shaped groove which diverges radially inwardly; and
wherein the correspondingly formed shoe is pulled radially outwardly by said adjusting means to effect said frictional engagement between the internal surface of said opening and the outer surface of said tool spindle sleeve.

5. The device according to claim 1, wherein said longitudinal groove is constructed as a rectangular groove; and
wherein the correspondingly formed shoe is a split shoe having a pair of circumferentially movable surfaces, said split shoe being expandable in a circumferential direction into engagement with said side surfaces of said longitudinal groove.

6. The device according to claim 1, wherein said groove is comprised of discontinuous surface means, the angle between each of said separate side surfaces and a bottom wall being in the range of 0° to 90°.

7. A clamping device, comprising:
a stationary spindle housing having an opening therethrough; an axially movable, thin-walled tool spindle sleeve mounted for axial movement relative to said opening, said opening having a close tolerance fit around said tool spindle sleeve;
means defining at least one axially extending elongated groove on the periphery of said tool spindle sleeve, said groove having at least a pair of substantially circumferentially facing and opposed side surfaces, said tool spindle sleeve being made of a radially expansible material facilitating a slight amount of radial expansion upon application of a circumferential force to said circumferentially facing side surfaces of said groove;
means defining at least one shoe received in said elongated groove, said shoe having a pair of substantially circumferentially and oppositely facing side surfaces, both of said side surfaces of said shoe having a contour corresponding to the contour of said circumferentially facing side surfaces of said groove and being opposed to one of said side surfaces of said groove and further being adapted to simultaneously frictionally engage said pair of opposed side surfaces of said groove; and
adjusting means for moving said oppositely facing side surfaces of said shoe into and out of frictional engagement with said opposed side surfaces of said groove to effect said slight radial expansion of said tool spindle sleeve, said frictional engagement being caused by a component of force acting at least in a circumferential direction relative to said tool spindle sleeve whereby said tool spindle sleeve is maintained in a fixed position within said opening by a combination of the frictional engagement between said side surface of said groove and said shoe and the frictional engagement between the outer diameter of said tool spindle sleeve and the internal surface of said opening after radial expansion of said tool spindle sleeve.

* * * * *